Jan. 20, 1953  C. E. PEDERSON  2,625,818
UNIVERSAL INSPECTION BRAKE DRUM
Filed June 28, 1950
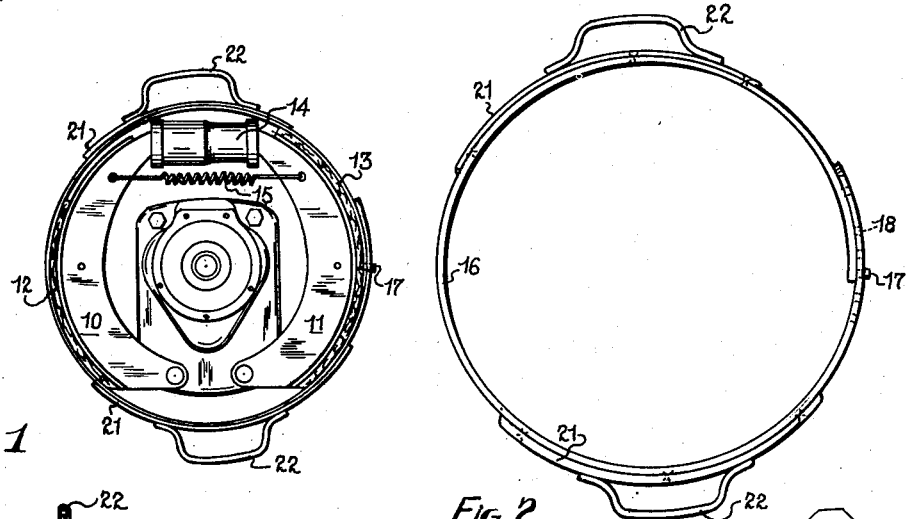
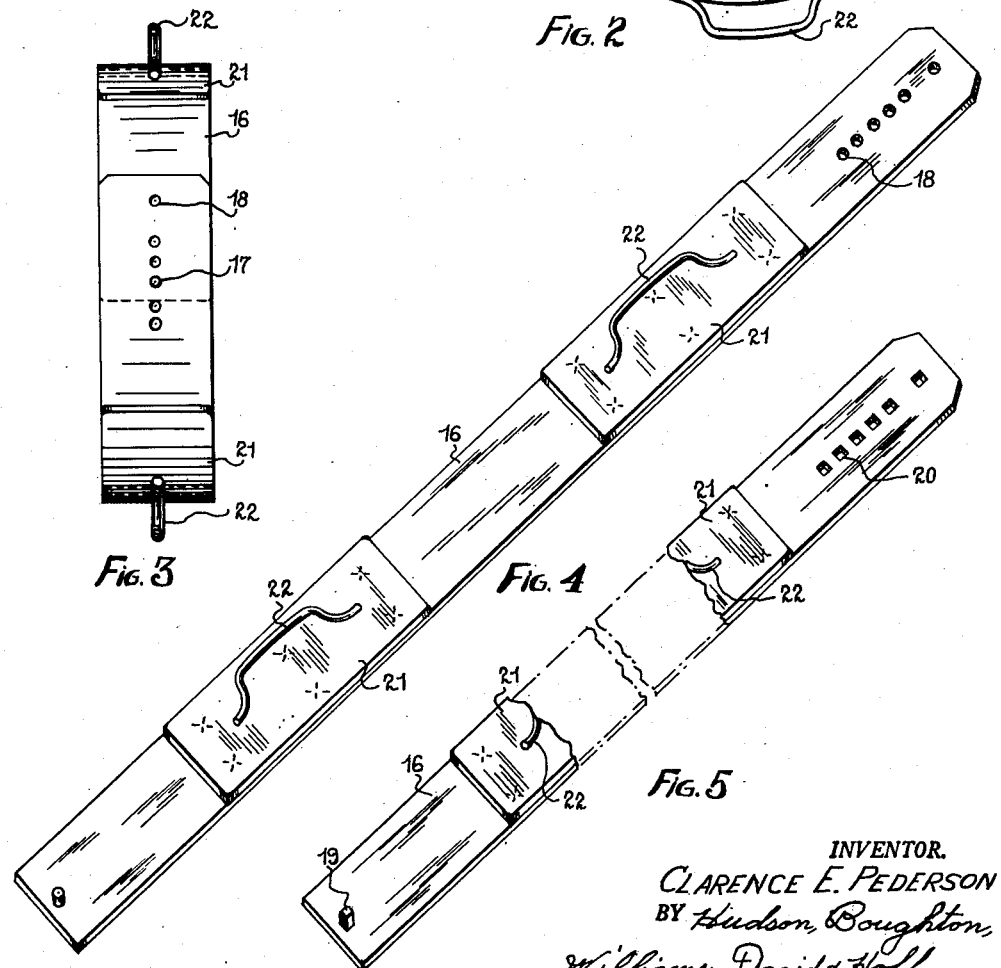
INVENTOR.
CLARENCE E. PEDERSON
BY Hudson, Boughton,
Williams, David & Hoffmann
ATTORNEYS

Patented Jan. 20, 1953

2,625,818

UNITED STATES PATENT OFFICE 2,625,818

UNIVERSAL INSPECTION BRAKE DRUM

Clarence E. Pederson, Albuquerque, N. Mex.

Application June 28, 1950, Serial No. 170,891

3 Claims. (Cl. 73—121)

This invention relates to a device for use in the proper maintenance, repair and adjustment of brake mechanisms for motor vehicles, and more particularly it relates to a dummy brake drum that is positionable on the brake mechanisms for inspection purposes.

As is well understood brake mechanisms of motor vehicles cannot be properly inspected and diagnosed for faults when the wheels and brake drums remain mounted over the brake mechanisms. If the wheels and brake drums are removed from the brake mechanisms and the latter are then actuated for inspection and diagnosing purposes there is no surface for the brake shoes and lining to react against and this frequently results in the necessity of rebleeding the cylinder and hydraulic line in the case of hydraulic brake mechanisms.

An object of the invention is to provide a simple and readily usable dummy brake drum which can be positioned over the brake mechanism of a motor vehicle after the wheel and regular brake drum have been removed therefrom, thus providing for inspection of the brake mechanism as it is actuated against the dummy brake drum to facilitate the proper diagnosis of what may be wrong with the mechanism.

Another object of the invention is to provide a dummy brake drum as referred to in the previous object and which drum is adjustable so as to be universally applicable to the brake mechanisms of various size motor vehicle wheels.

A more general object is to provide a dummy brake drum which can be placed over the brake mechanism and which allows the operator to watch the operation of the brake mechanism to determine visually if the cylinder thereof is working properly and is in satisfactory condition, or if the hydraulic brake line is stopped up or if the brake shoes are operating with equalized movement or one or the other thereof is improperly functioning with a possible resulting excessive brake lining wear on one or the other of the shoes.

More generally it is an object of the invention to provide a dummy brake drum construction which can be applied to the brake mechanism to facilitate diagnosis of the condition of the mechanism and thus enable the repair man to more efficiently, effectively and readily perform the necessary repair operations to put the mechanism into perfect operating order.

Further and additional objects and advantages not hereinbefore referred to will become apparent hereinafter during the description of embodiments of the invention which are illustrated in the accompanying drawing wherein, Fig. 1 is an elevational view of the brake mechanism for a motor vehicle wheel with the wheel and the regular brake drum removed therefrom and a dummy brake drum embodying the invention mounted thereon.

Fig. 2 is a view on a larger scale than Fig. 1 and shows the dummy brake drum in elevation.

Fig. 3 is an elevational view of the dummy brake drum and is taken looking from the right hand side of Fig. 2.

Fig. 4 is a developed view of the brake drum shown in the previous views, and

Fig. 5 is a broken away shorter developed view of a dummy brake drum embodying the invention and is similar to Fig. 4, except that in Fig. 5 the interengaging fastening and adjusting means for the overlapping opposite ends of the brake drum are different than the corresponding means in Fig. 4.

Referring to Fig. 1, 10 and 11 represent the pivoted brake shoes of a hydraulic brake mechanism for a motor vehicle wheel. The brake shoe 10 is shown as provided with a brake lining 12, while the shoe 11 is illustrated as having a longer brake lining 13. The brake shoes 10 and 11 are hydraulically actuated or expanded by a cylinder and piston unit indicated at 14 and connected to the hydraulic pressure brake circuit. A spring 15 functions to normally maintain the brake shoes 10 and 11 in their inactive position whenever the pistons in the unit 14 are not subject to hydraulic pressure. The brake mechanism described is of well known construction and per se forms no part of the present invention. As is understood by those skilled in the art when hydraulic pressure is applied to the pistons in the unit 14 the brake shoes 10 and 11 are expanded to cause the brake linings 12 and 13 thereof to press against the regular brake drum carried by the vehicle wheel and not shown herein.

The dummy brake drum embodying the invention comprises a band 16 formed of metal of suitable thickness and elasticity and bent into a circle or ring with its opposite ends overlapped. When the band 16 is thus bent and its opposite ends secured in the overlapped condition referred to, said band is similar to the annular or ring-like portion of the regular brake drum. In order that the dummy brake drum may be formed into rings or circles of various diameters so as to fit on the brake mechanisms of the varying sized wheels of motor vehicles, the overlapped ends of the band 16 have provision for securing the same in different adjusted relationships.

In Figs. 1 to 4 inclusive one end of the band is shown as provided with a cylindrical plug or pin 17 which for purposes of adjustment can be selectively positioned in any one of a series of spaced round openings 18 formed in the opposite end of the band and will be held engaged in such opening by the elasticity of the ring.

In Fig. 5 a rectangular plug 19 is fixed on one end of the band 16 in place of the round pin 17 and said plug 19 can be selectively engaged in any one of the series of rectangular openings 20 formed in the other end of the band. In other words, the interengaging pin or plug and openings formed in the opposite ends of the band may take various shapes as desired and provide a simple means for adjusting the diameter of the dummy brake drum to enable it to be properly positioned upon a particular brake mechanism.

It is also conceivable that other means might be employed for adjustably securing together the ends of the band 16 in proper relationship as, for instance, the opposite ends of the band may be provided with lugs mounting adjustable screw means for securing the ends in the desired relationship to produce a dummy brake drum of a particular diameter.

In order that the dummy brake drum will be reenforced and have the requisite strength in use to prevent bending of the drum at those portions which do not contact the brake mechanism, the drum is shown as reenforced at substantially diametrically opposite points with elongated arcuate reenforcing plates 21 secured to the outer circumference of the drum by welding or by any other suitable means. It will be understood, of course, that in place of the separate reenforcing plates 21 the band 16 at the same locations could be made thicker so as to provide integral reenforcing portions thereon.

In order to facilitate the handling of the dummy brake drum and the positioning of the same on the brake mechanism, the drum is shown as provided with handles 22 secured by suitable means, such as welding, soldering or otherwise to the reenforcing plates 21.

Preferably the dummy brake drums will be employed in sets of four so as to be used simultaneously on the brake mechanisms of the four wheels of a motor vehicle. However, in describing the use and function of the dummy brake drum a single drum and brake mechanism will be referred to.

Assuming that it is desired to inspect the brake mechanism of a particular wheel of a motor vehicle that wheel and its regular brake drum is removed. The dummy brake drum is then adjusted as to diameter to properly fit over the brake mechanism and to take the place of the regular brake drum, it being understood that the operator can so position the dummy brake drum without difficulty by means of the handles 22. When the dummy brake drum is thus positioned the brake linings on the brake shoes of the brake mechanism will lie in juxtaposition to the dummy brake drum intermediate the reenforcements 21, as clearly indicated in Fig. 1. Then when the brake pedal in the motor vehicle is operated the operator can observe the manner in which the brake mechanism functions, that is, he can see if the brake shoes are properly and equally engaging the dummy brake drum or if one shoe or the other is not functioning properly. He can also observe if the hydraulic unit 14 is properly functioning or otherwise and thus he will be enabled to make an accurate diagnosis of any faults which may exist in the brake mechanism and which require repair or attention.

The use of the dummy brake drum means that the brake shoes are actuated against the dummy brake drum in the same manner as they would be actuated against the regular brake drum and hence the operation of the brake shoes when the wheel has been removed and the dummy drum applied to the mechanism is free of the danger which is always present in operating a brake mechanism without a drum thereon.

From the foregoing it will be evident that the dummy brake drum embodying the present invention is of such character as to facilitate and make more accurate and dependable the diagnosis of brake faults in a motor vehicle and enable the operator to more efficiently and properly perform the necessary adjustments or repairs thereon, thus assuring the customer of receiving proper and economical brake service.

Although preferred embodiments of the invention have been illustrated and described herein, it will be understood that the invention is susceptible of various modifications and adaptations within the scope of the appended claims.

Having thus described my invention, I claim:

1. A dummy brake drum adapted to be positioned on the brake mechanism of a motor vehicle after the wheel and regular brake drum have been removed therefrom, said dummy brake drum comprising a band of substantially the width of the regular brake drum and formed into a ring and having its opposite ends provided with cooperating means for adjustably interconnecting said ends to vary the diameter of the ring in accordance with the diameter of the regular brake drum, and reenforcing plates secured to the exterior of said ring at substantially diametrically opposite locations to reenforce those portions of the ring which do not contact the brake mechanism.

2. A dummy brake drum adapted to be positioned on the brake mechanism of a motor vehicle after the wheel and regular brake drum have been removed therefrom, said dummy brake drum comprising a band of substantially the width of the regular brake drum and formed into a ring, one end of said band being provided with a series of longitudinally spaced openings, the other end of said band being provided with a projecting plug adapted to interfit any one of said openings to adjustably interconnect said ends to vary the diameter of the ring in accordance with the diameter of the regular brake drum, reenforcing plates secured to said ring exteriorly thereof at substantially diametrically opposite locations to prevent bending of said ring at those portions which do not contact the brake mechanism, and handles secured to said reenforcing plates to facilitate the application of the dummy brake drum to the brake mechanism and its removal therefrom.

3. A dummy brake drum adapted to be positioned on the brake mechanism of a motor vehicle after the wheel and regular brake drum have been removed therefrom, said dummy brake drum comprising a band of substantially the width of the regular brake drum and formed into a ring and having its opposite ends provided with cooperating means for adjustably interconnecting said ends to vary the diameter of the ring in accordance with the diameter of the regular brake drum, said ring having substantially diametrically opposed thickened reenforcing portions to reenforce the ring and prevent bending thereof at those locations where the ring does not contact the brake mechanism when applied to the latter.

CLARENCE E. PEDERSON.

REFERENCES CITED

The following references are of record in the file of this patent:

UNITED STATES PATENTS

| Number | Name | Date |
|---|---|---|
| 1,759,714 | Rode | May 20, 1930 |
| 1,775,075 | Watson et al. | Sept. 2, 1930 |
| 2,469,381 | Galko | May 10, 1949 |